April 12, 1932.   A. E. MILLINGTON   1,853,774
PAPER MANUFACTURE
Filed Nov. 20, 1929    12 Sheets-Sheet 4
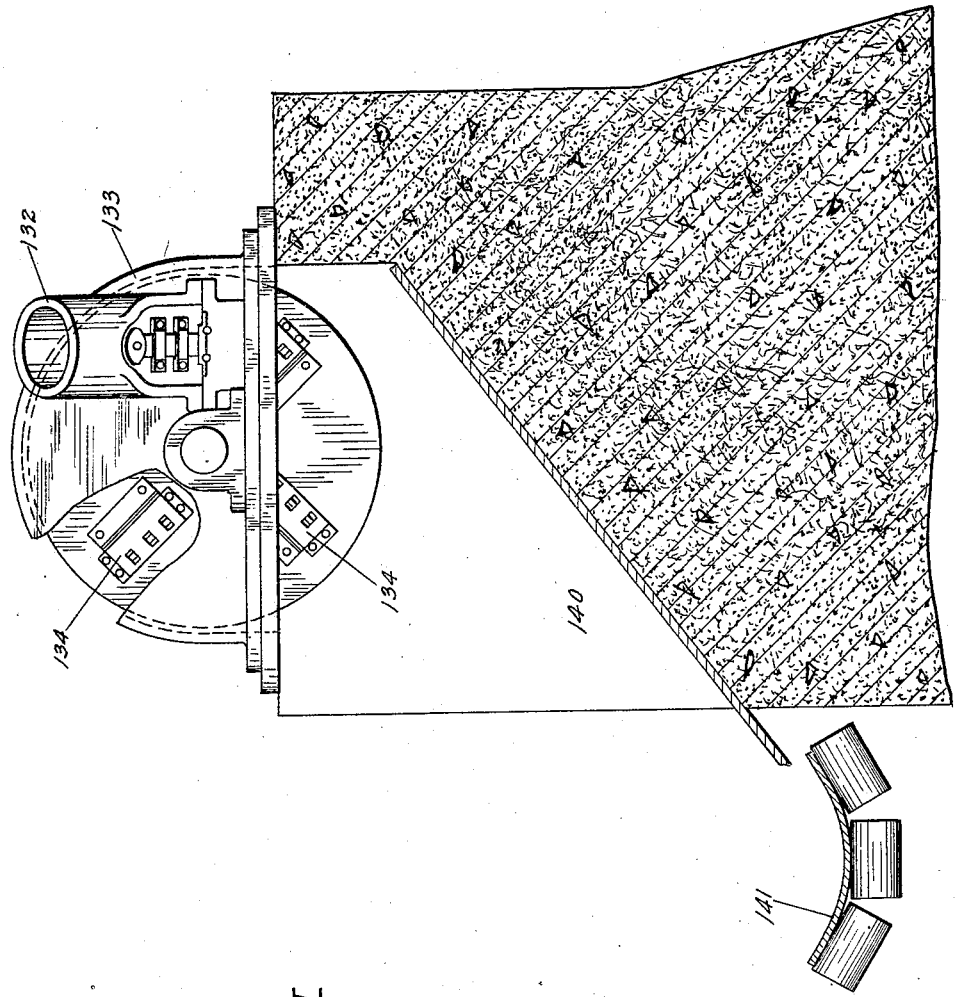
Inventor:
Arthur E. Millington,
By Atkins & Atkins,
Attorneys April 12, 1932.　　A. E. MILLINGTON　　1,853,774
PAPER MANUFACTURE
Filed Nov. 20, 1929　　12 Sheets-Sheet 5
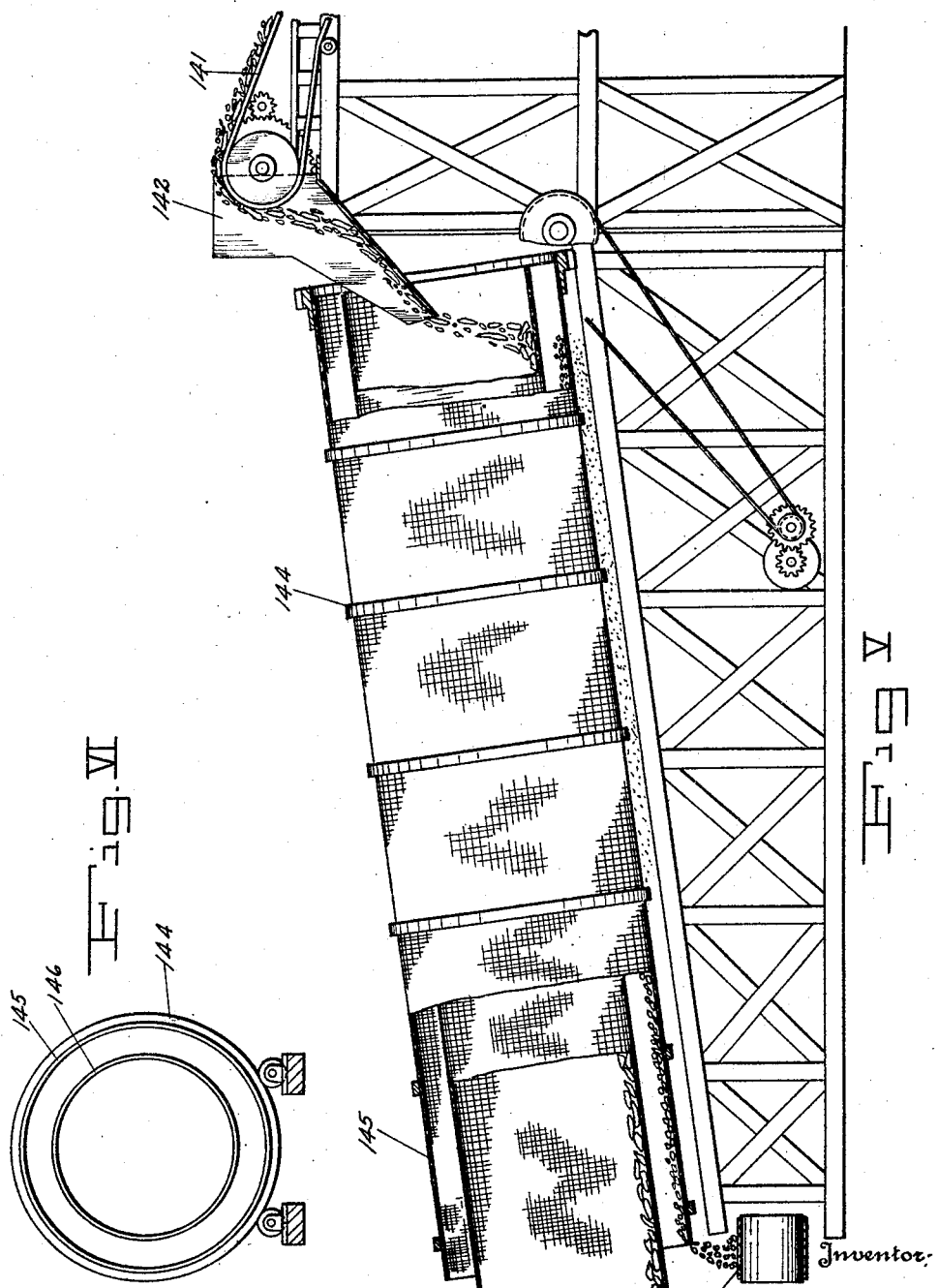

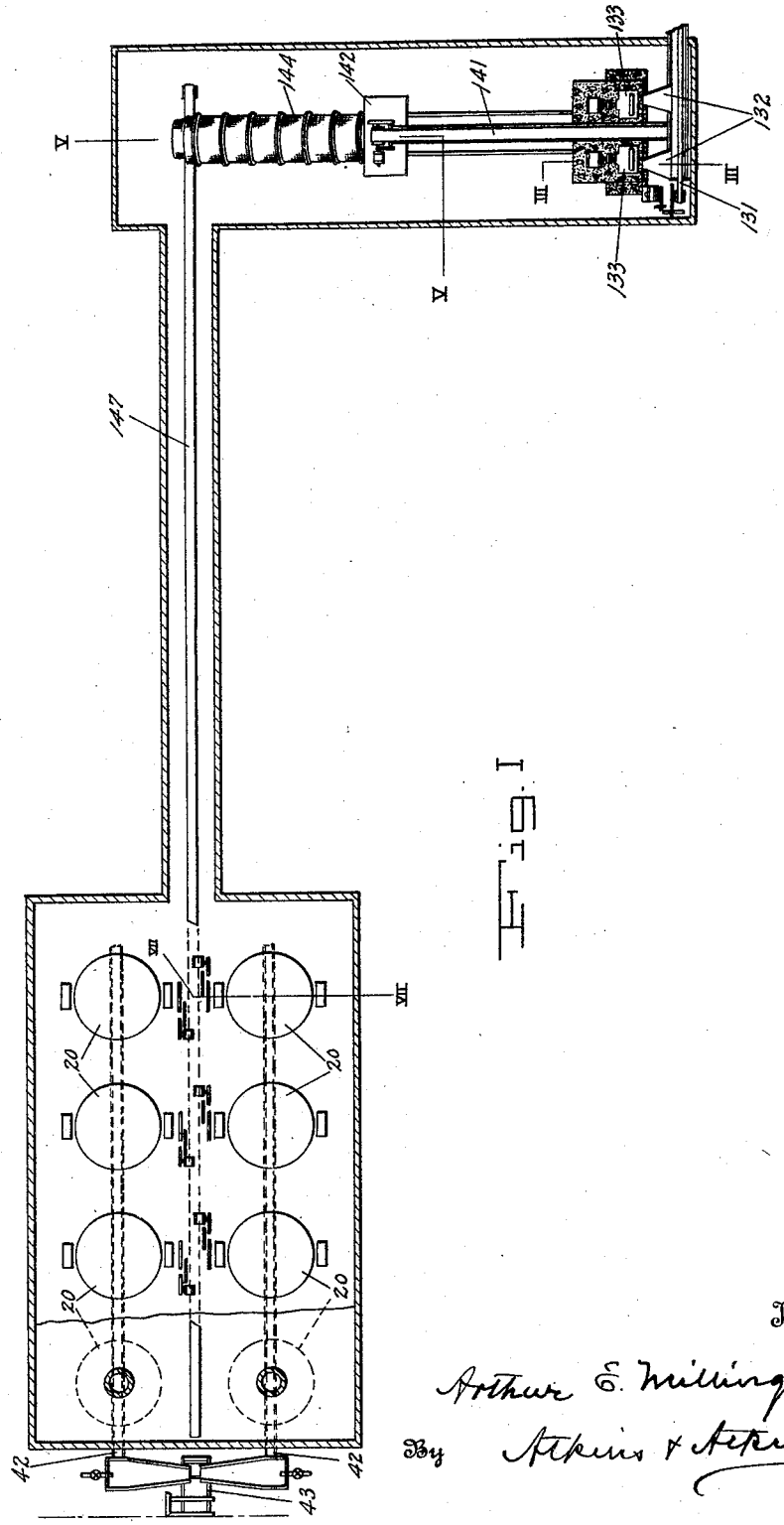
April 12, 1932. A. E. MILLINGTON 1,853,774
PAPER MANUFACTURE
Filed Nov. 20, 1929 12 Sheets-Sheet 1
Fig. I

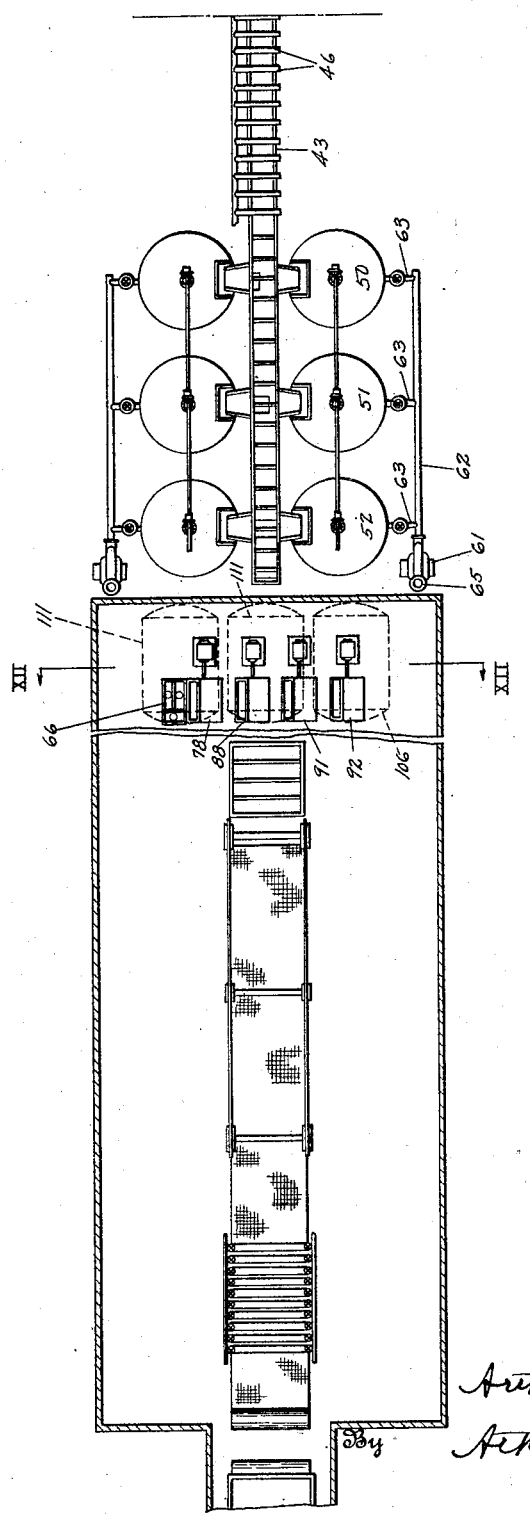

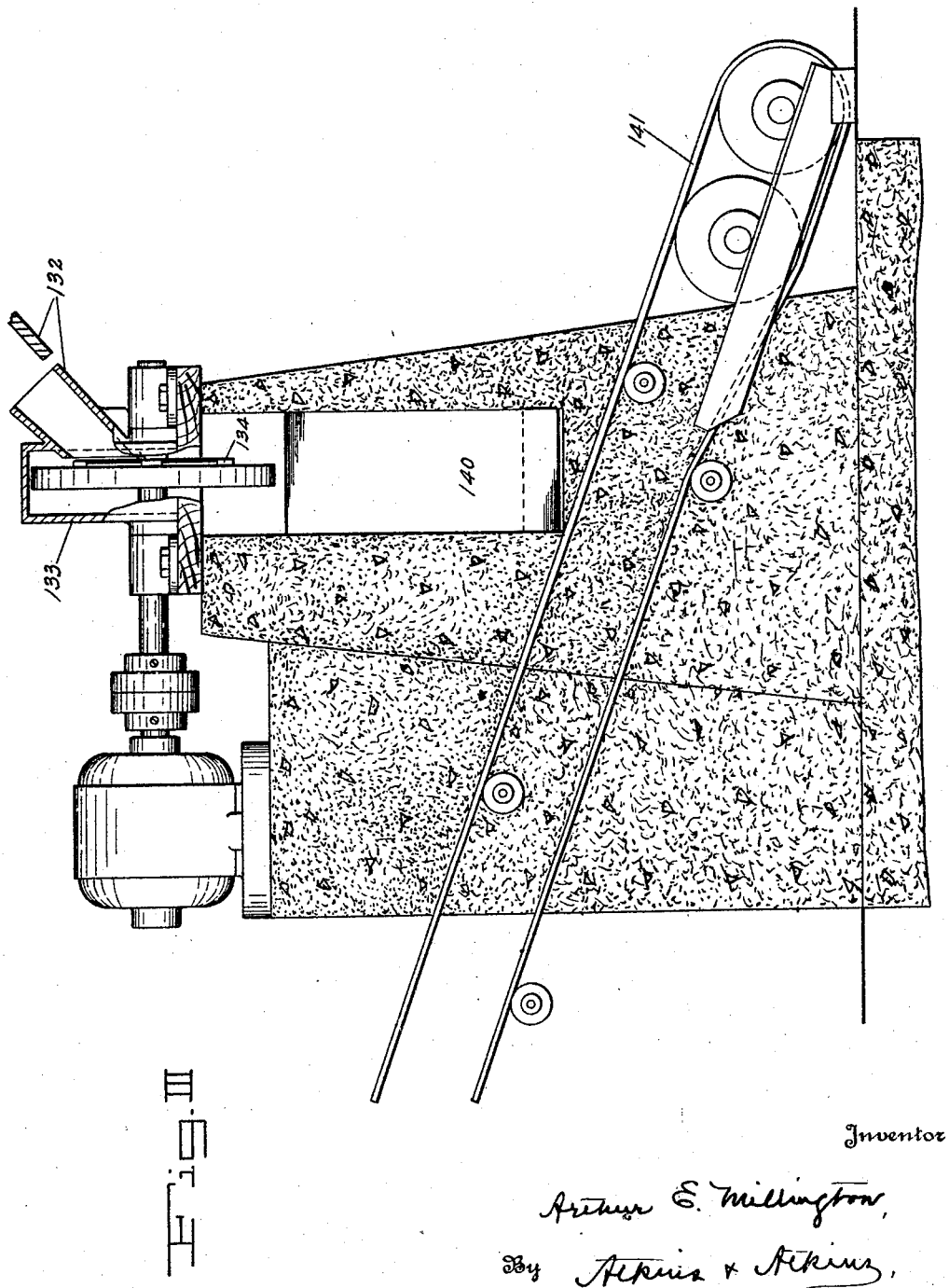

April 12, 1932.   A. E. MILLINGTON   1,853,774
PAPER MANUFACTURE
Filed Nov. 20, 1929   12 Sheets-Sheet 6
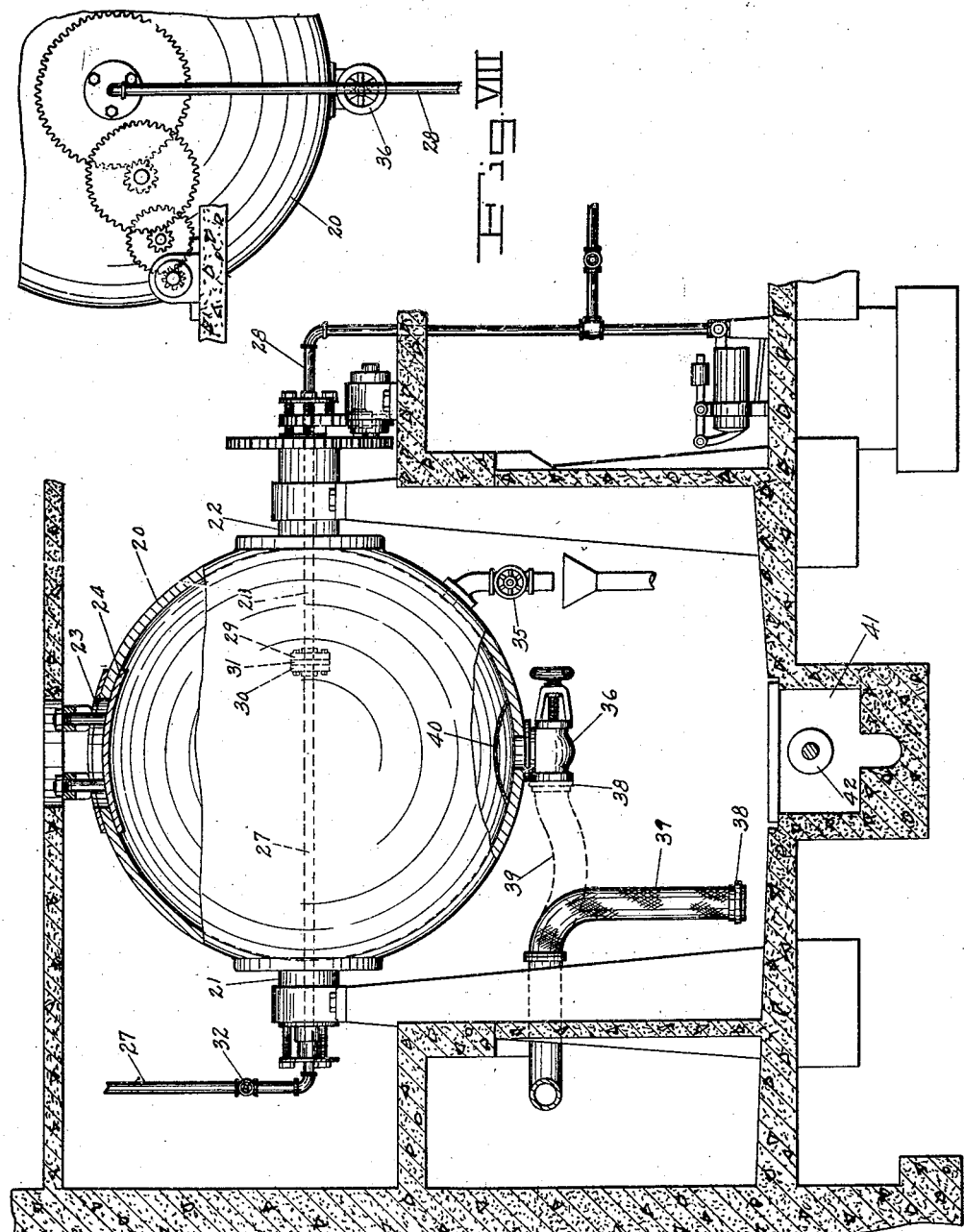

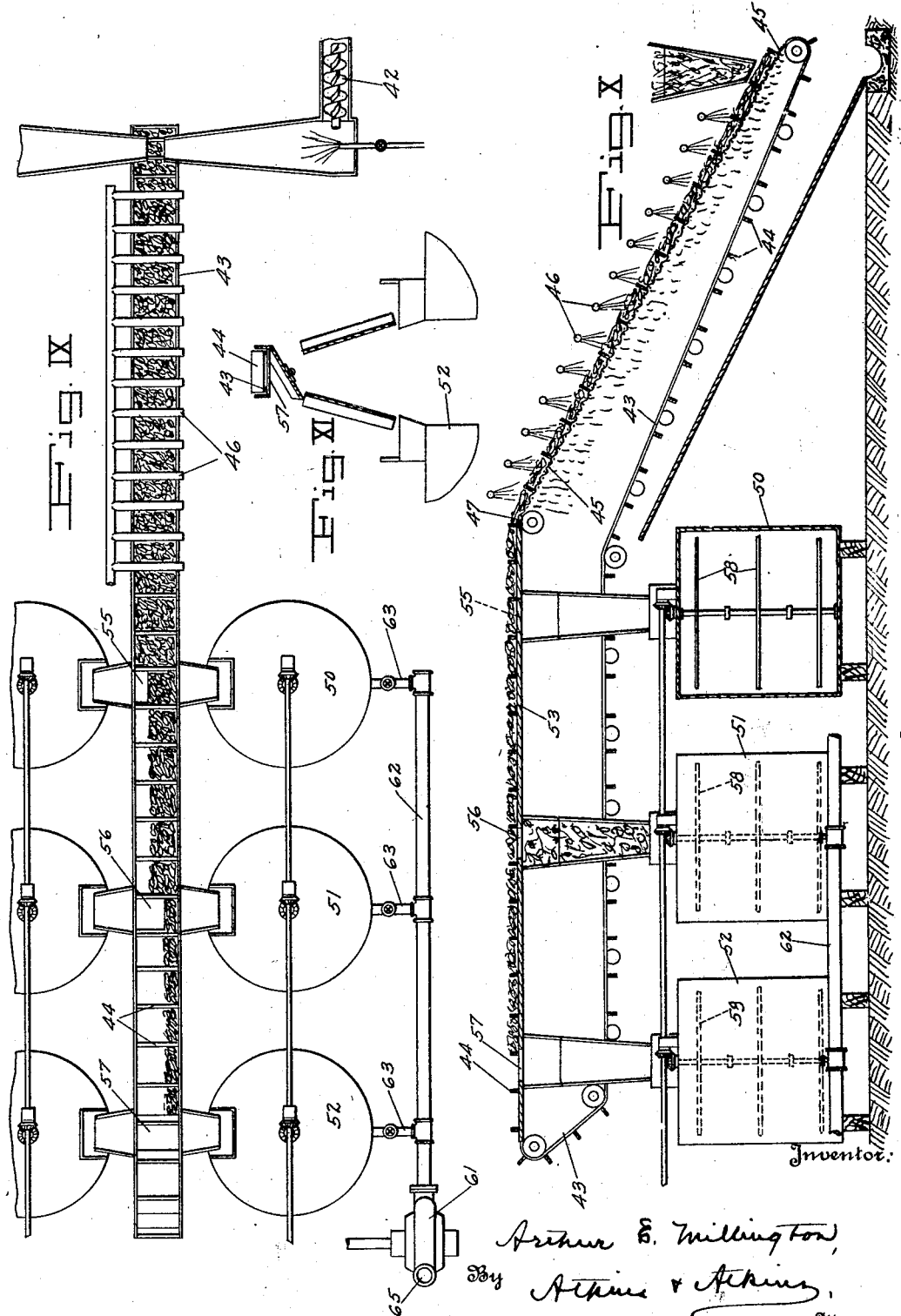

April 12, 1932. A. E. MILLINGTON 1,853,774
PAPER MANUFACTURE
Filed Nov. 20, 1929 12 Sheets-Sheet 8
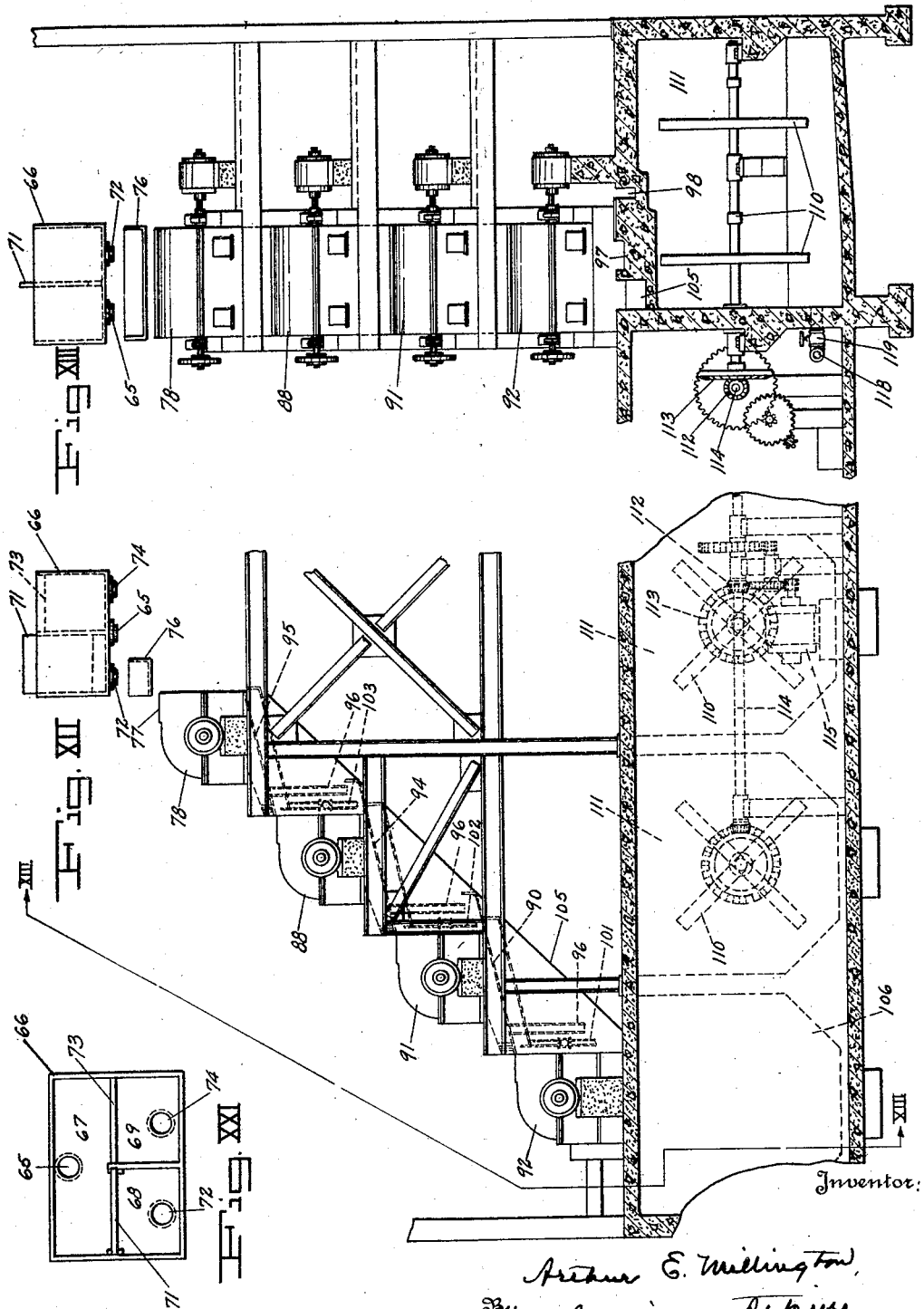

April 12, 1932. A. E. MILLINGTON 1,853,774
PAPER MANUFACTURE
Filed Nov. 20, 1929 12 Sheets-Sheet 9
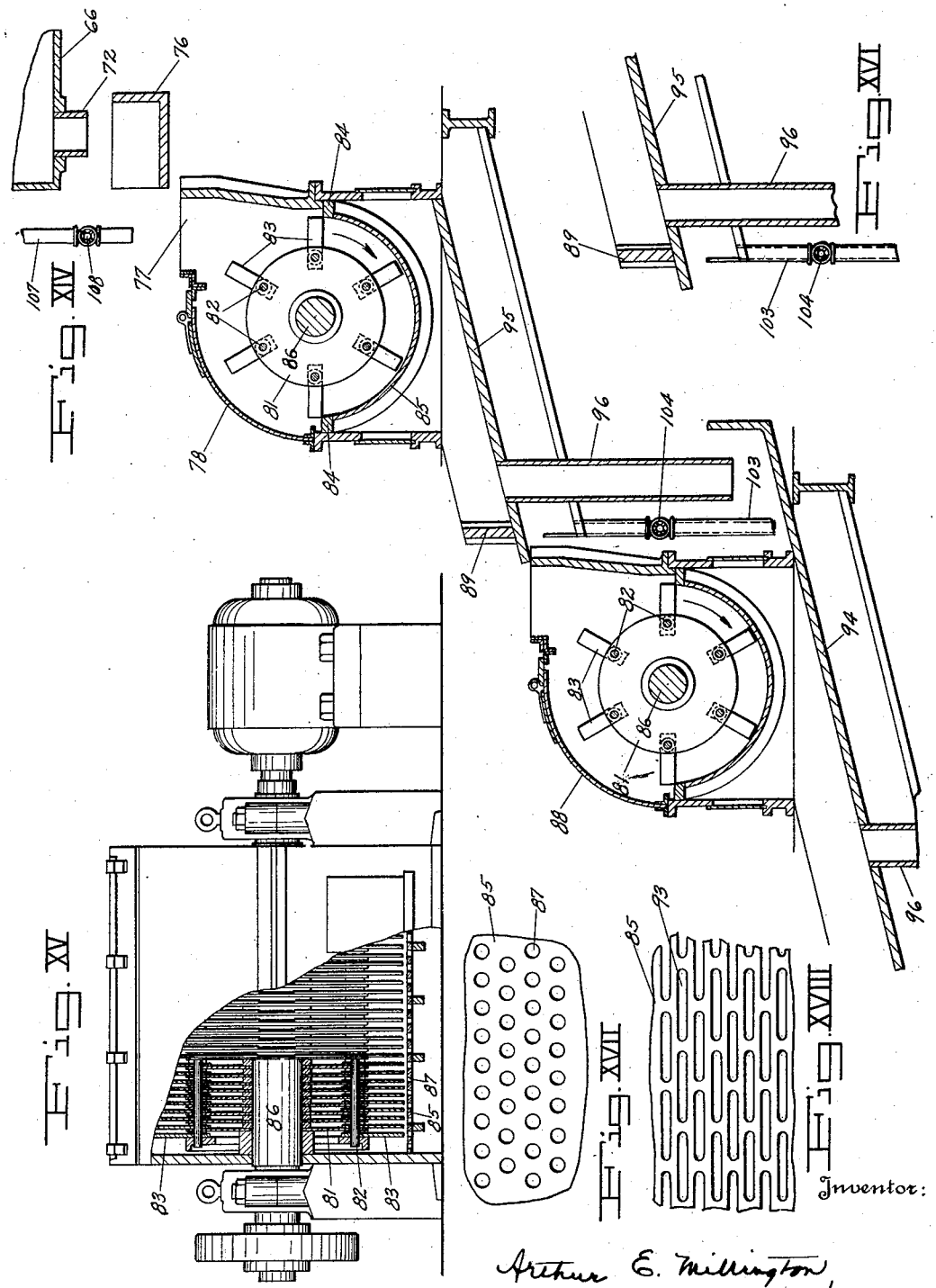
Inventor:
Arthur E. Millington,
By Atkins & Atkins,
Attorneys.

April 12, 1932.  A. E. MILLINGTON  1,853,774
PAPER MANUFACTURE
Filed Nov. 20, 1929   12 Sheets-Sheet 10
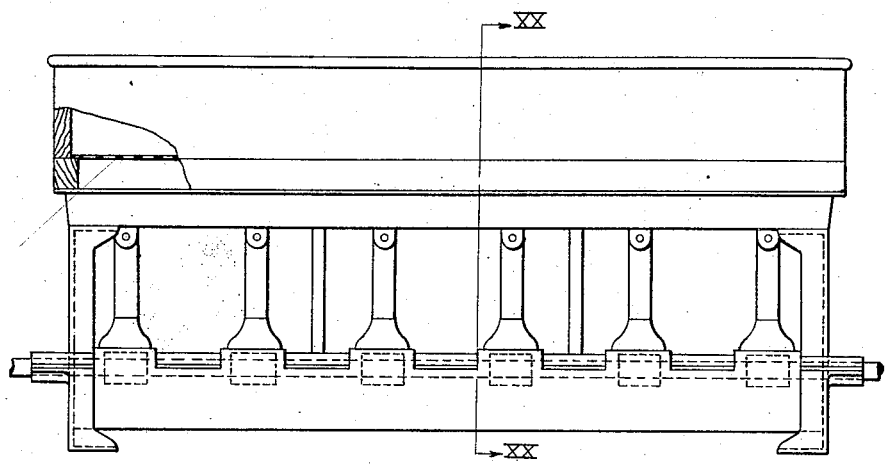
Fig. XIX
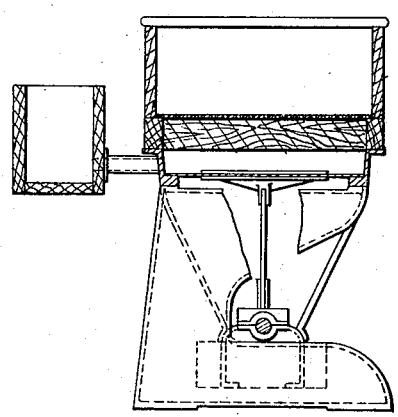
Fig. XX April 12, 1932.   A. E. MILLINGTON   1,853,774
PAPER MANUFACTURE
Filed Nov. 20, 1929   12 Sheets-Sheet 11
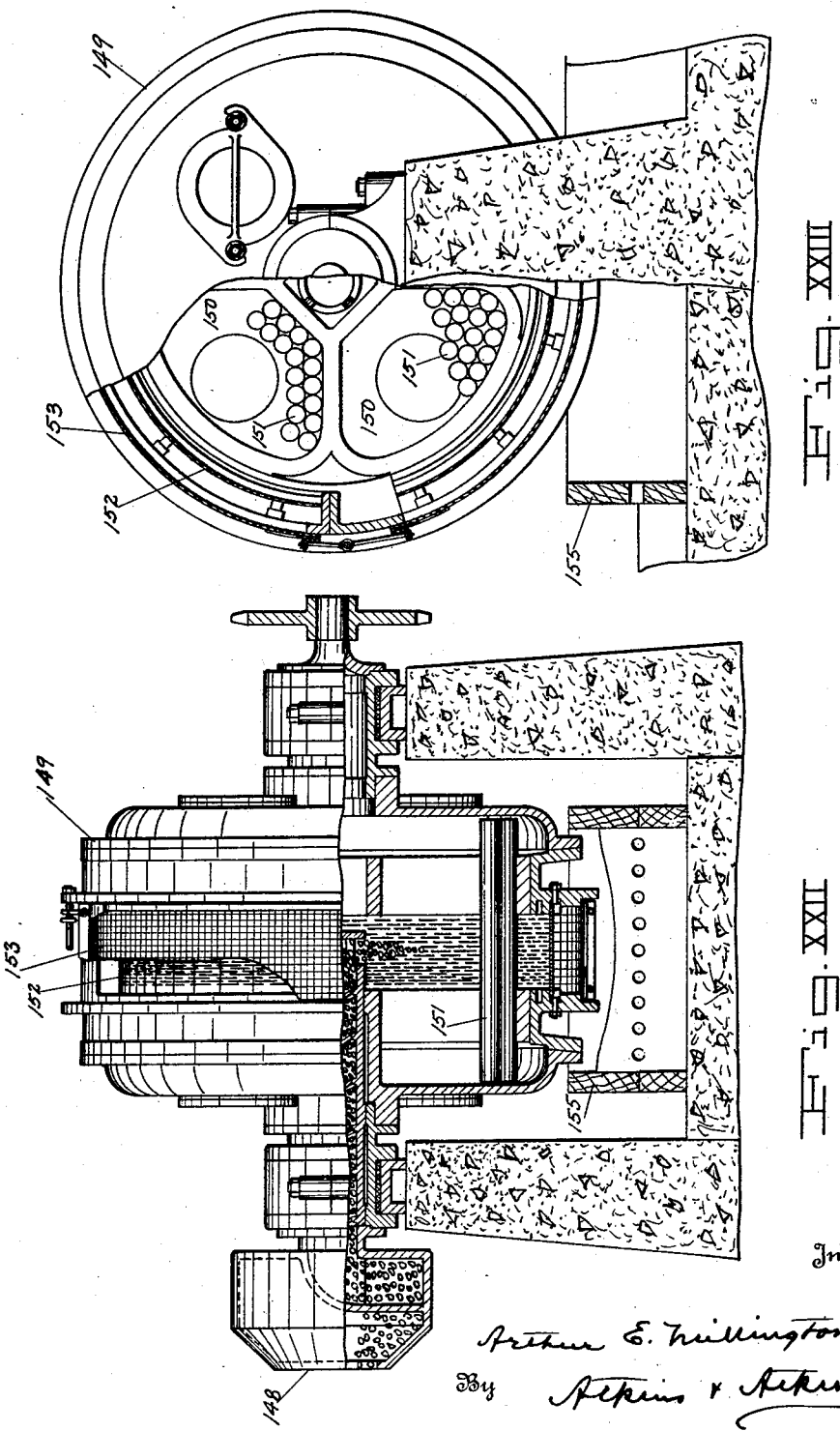

April 12, 1932.  A. E. MILLINGTON  1,853,774
PAPER MANUFACTURE
Filed Nov. 20, 1929  12 Sheets-Sheet 12
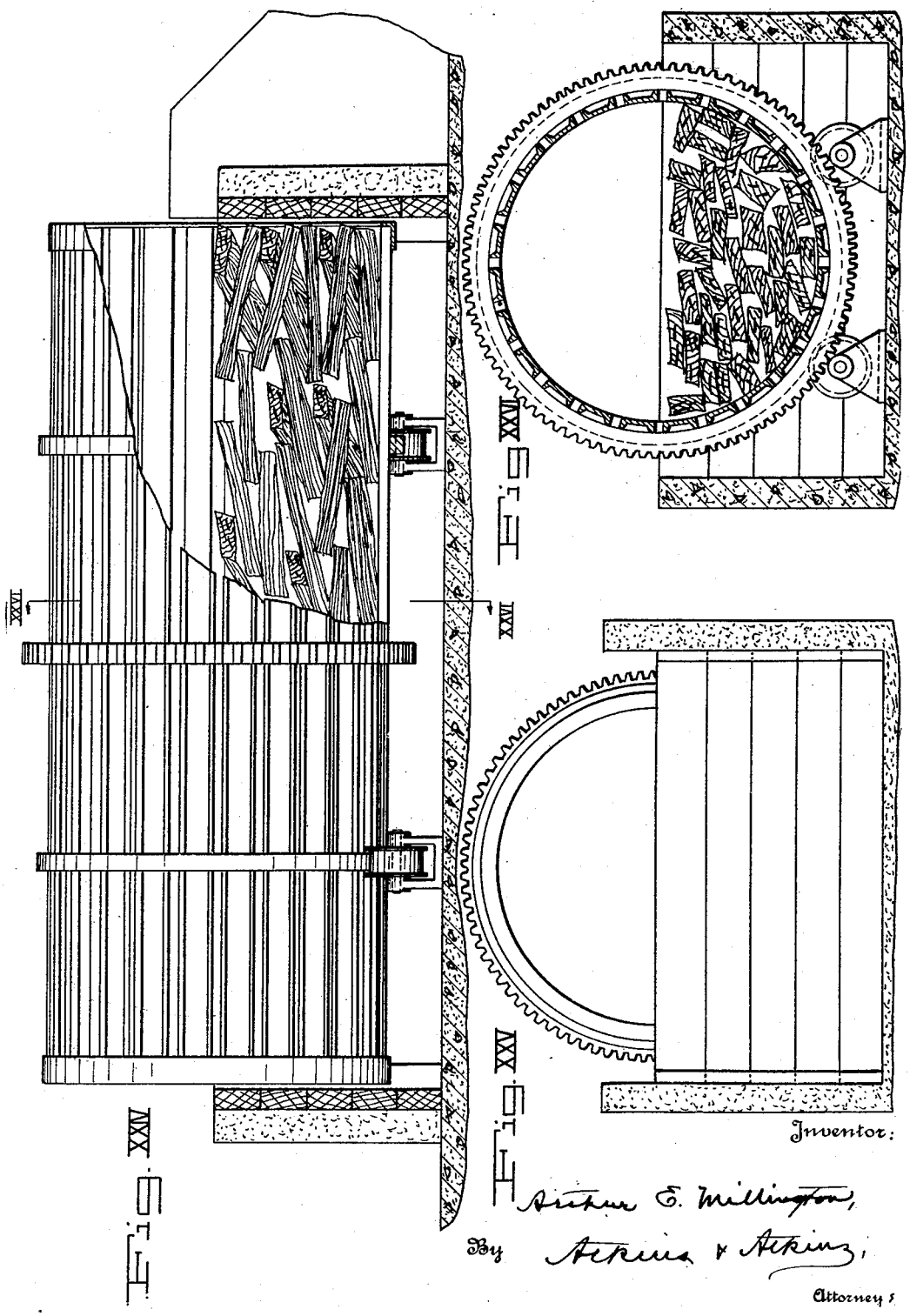

Patented Apr. 12, 1932

1,853,774

UNITED STATES PATENT OFFICE

ARTHUR E. MILLINGTON, OF PORTLAND, OREGON

PAPER MANUFACTURE

Application filed November 20, 1929. Serial No. 408,564.

This invention relates generally to the manufacture of paper, and has particular reference to a new quality of material of the kind mentioned, and to method and apparatus for producing such material.

A broad object of the invention is to provide a method of producing paper from suitable material of my invention which will yield fiber of a distinctive nature that is chemically unweakened in the process of its manufacture and which is, by my further invention, convertible into paper stock.

An incidental object of my invention is further to provide a method of paper manufacture generally, which can be carried on at a very low plant operating expense, and with a substantially minimum outlay for manufacturing equipment. It may be mentioned particularly that in the item of power I am, by my invention, enabled to effect a saving of substantially one-half.

Another object of the invention is to produce a paper which will have great strength. This is achieved mainly by the factor of utilizing the fiber in substantial lengths, and by that of preserving it in a substantially unweakened condition as it is produced in nature. The former factor is attained by eliminating the grinding or equivalent comminuting process usually employed in paper manufacture, and the latter factor is attained by the elimination in the process of manufacture of the use of chemicals that impair the natural strength of the fiber.

Another object is to provide a novel combination of mechanisms and interconnections by means of intercommunication between them which is adapted to carry out my invention in respect to the novel method and the novel product obtainable thereby at a relatively high production rate and at a substantially minimum cost, compared with any other known method of paper manufacture.

Other objects and advantages will be apparent to one skilled in the art from the description hereinafter given, and from an examination of the drawings, which accompany and form a part of this specification.

What constitutes my invention will be hereinafter described in detail and succinctly defined in the appended claims.

In the accompanyinbg drawings,

Figure I is a plan view showing in somewhat diagrammatic form the relation of chipping, screening, and boiling portions of the apparatus.

Figure II is a continuation of Figure I, partially broken away, and shows the stock tanks for the softened material and some of the devices subsequently called into action.

Figures III and IV are views taken, respectively, from different angles, of the chipper and some of the mechanism associated therewith.

Figures V and VI are, respectively, side and end views of the chip screening apparatus.

Figures VII and VIII are, respectively, a partial front elevation partly in section of the boiler, and an end elevation of gearing suitable for driving it.

Figures IX, X, and XI, respectively, show details of the devices for distributing the softened material among the storage tanks provided for its reception.

Figure XII is a section on the line XII—XII of Figure II, and shows among other things the fiber separating machines.

Figure XIII is a section of the mechanism shown in Figure XII, taken on the line XIII—XIII of said figure.

Figures XIV, XV, XVI, XVII, and XVIII collectively show the construction of the fiber separating machines.

Figure XIX is a side elevation, partly in section, of a screen mechanism for reception of the softened wood fibers in suspension from the sluice-way indicated in Figures XXII and XXIII.

Figure XX is a vertical section on the line XX—XX of Figure XIX.

Figure XXI is a top plan view of the flow box, as shown in Figures XII, XIII, and XIV, detached.

Figure XXII is a side elevation partly in section of a rod mill employed as a preferred form of apparatus for homogenizing the softened fibers utilized in my present method of paper manufacture.

Figure XXIII is an end view, partially in section, of the subject matter of Figure XXII.

Figure XXIV is a side elevation, partly in section, of a barking machine of the type preferred for removing the bark from wood preparatory to its being subjected to the chipping operation indicated, for example, in Figures II and IV.

Figure XXV is an elevation of the intake end of the machine shown in Figure XXIV.

Figure XXVI is a section on the line XXVI—XXVI of Figure XXIV.

Stated in a general way, the present invention includes means for utilizing for paper manufacture fiber isolated from a suitable fibrous raw material such as wood, for example, by a process of softening the fibrous material whereby separation of the fiber from the remaining constituent elements of the wood or like substances is effected substantially without weakening or impairment of the strength of the fiber. Such softening process consists mainly in boiling wood or the like, in such a manner and preferably in a weak solution of soda ash or the like, so as to effect the separation of the fibers by dissolving out of the the wood the resins or other substances which bind them together in the natural state. This softening operation is carried on, preferably, in a rotary boiler and in the presence of live steam, and without the use of chemicals that impair the strength of the fibers, although the boiling of the wood may be effected in other ways.

In actual practice the rotary boiler is filled approximately to half of its capacity with wood or the like which has been reduced to suitable sizes, or to dimensions under a maximum size, and the boiler is then filled with water to within 90 percent, approximately, of its capacity. At any time before the softening operation is started, commercial soda ash may be added to the contents of the boiler in any suitable way, although all that is necessary is to dump the proper amount of the soda ash, in proportion to the amount of material in the boiler, thereby making unnecessary the employment of expensive equipment such as chemical houses, solution vats and the like that have been heretofore required in paper manufacture. The most desirable results are obtained in the practice of my invention by using about one and one half pounds of soda ash for each cubic foot of the wood material to be treated, although the amount of soda ash, if used, may be varied for different woods. The boiler is then closed as by a manhole cover provided for the purpose, and rotation of the boiler is started so as to agitate, as by tumbling, the contents therein. The boiler may be run dry for a short preliminary period to cause a thorough commingling of its solid contents, after which steam may be turned into it, or the setting of the boiler into motion and the admission of the steam into it may be simultaneous.

The rotation of the boiler, and the admission thereinto of the steam are continued until substantially all of the natural gums, resins, and the like, or other substances which hold the fibers together in their natural state, are separated and are largely removed from the fibers. While this is going on, a bleeder is operating, preferably in an automatic manner, to remove some of the liquor from the condenser so as to maintain the desired temperature and compensate for or offset the effects of steam condensation.

The amount preferred, as aforesaid, of soda ash per cubic foot of material to be treated, that is, one and one-half pounds per cubic foot, will give a solution in the boiler of about 3½° Baumé. Owing to the steam condensation and operation of the bleeder carrying off the liquor, the Baumé will, however, gradually be lowered, until at the end of the softening operation, the Baumé will be 1° or possibly less. Even if the nature of the material requires a greater amount of the soda ash, the Baumé will seldom exceed 6° with a decrease in the Baumé as the softening operation proceeds.

Said operation, as so far described, takes from twelve to twenty-eight hours, according to conditions, such, for example, as the volume of the boiler contents, the temperature of the steam employed, and the nature of the wood. Relatively high temperatures of steam may be used, because of the fact that by my invention the boiler is made to contain a great deal more water than is customary in other processes, the great volume of water preventing the scorching or charring of the material, which has, in part, been one obstacle in the way of shortening cooking operations in other processes by increase of temperature. The steam is preferably introduced into the boiler near the center thereof or on an axial line, and is thence distributed by branch pipes so as to aid or supplement the rotary movement of the boiler in operation for effecting a thorough agitation and uniform heating of the contents of the boiler.

When the operation described in the last preceding paragraph is completed, the wood particles, though softened thereby, will still retain substantially their original sizes and shapes. In other words, they are not disintegrated or dissolved by the operation, this being one important distinction between the present process and prior processes employed in making pulp to be used in the manufacture of paper and the like. Moreover, the fibers in the woody matter will be in chemically unweakened condition, thereby differing, in another respect, from the result obtained by prior processes.

A satisfactory form of boiler for the purpose indicated is illustrated in the drawings, Figure VII, by way of example. This part of the apparatus consists, preferably, of an unlined globular iron shell 20 rotatably mounted on trunnions 21 and 22, disposed co-axially with a horizontal axis, and provided with a manhole 23 and cover 24 of the usual type. This manhole is, in the filling position of the boiler, disposed at the top thereof, and the water, soda ash, and raw material are dumped or poured into the boiler which is then closed by setting and bolting the manhole cover in position. The steam is admitted through a steam supply pipe 27 extending axially through one of the supporting trunnions for the boiler on one side thereof, a bleeder pipe 28 extending outwardly through the trunnion at the opposite side. The pipes 27 and 28 are bolted together end to end by aid of terminal flanges 29 and 30 between which is interposed a division plate 31 which intercepts communication between them. The shell 20 revolves on its trunnions about the fixed pipes 27 and 28 as an axis. The admission of steam to the boiler is controlled as by the usual valve 32, and the bleeder is equipped with the usual automatic trap, not illustrated. Associated with the bleeder, a hand-operated valve 35 and pipe are preferably employed, the valve being so placed and constructed that it may be operated, when the softening operation is completed, to relieve the boiler from the larger part of its internal pressure and of much of the liquid contents.

Disposed at the side of the boiler preferably diametrically opposite the manhole is a blow-off pipe having a valve 36 and which is adapted to be connected by a suitable union 38 to a drain pipe or hose 39 leading to a sewer or other discharge point. The interior of the boiler around the outlet to the blow-off pipe is provided preferably with a perforated plate or screen 40 of sufficient fineness as a means to retain in the boiler substantially all of the useful material while allowing the waste liquor to pass without material interference with drainage. This construction is much cheaper and simpler than the usual blow-pit used in pulp-making operations, and results, in itself, in a substantial reduction in the cost of plant construction.

After the liquor has drained off, the remaining contents remaining in the boiler may be washed, as by means of an ordinary hose or the like inserted through the manhole of the boiler, until all of the refuse liquor and its contents are washed out, such washing also removing substantially all of the remaining dissolved and soluble matter not carried off with the liquor in drainage. This washing operation in the boiler consumes only a few minutes, and may, under certain conditions, be omitted in view of a subsequent washing operation later mentioned which is effected after the material leaves the boiler.

After the waste liquor has been withdrawn and the washing in the boiler, if any, completed, the blow-off pipe union 38 is disconnected from the drain pipe 39, and the boiler is given say a half turn so as to permit the softened and washed material to drop from the boiler into a receptacle 41. This receptacle, as shown in Figure VII, is preferably constructed with its sides converging toward the bottom so as to concentrate the material in it toward a screw conveyor 42. This screw conveyor carries the previously treated material from the receptacle 41 to a conveyor 43 (Figures II, IX, and X) that is preferably a chain conveyor comprising cross-bars 44 of the usual type, and operating on an incline as shown in Figure X. In the run of this conveyor, which is used for conveying the material, the bars 44 pass above and in close contact with a screen 45 which is of comparatively fine mesh. Located above the screen 45 and cross bars 44 is a washer, for example, a set of shower pipes 46 which thoroughly sprinkle and wash the material as it is carried up over the said screen 45, the water escaping through the screen to a sewer conduit or other means of discharge. When the washed material finally leaves the end 47 of the screen 45 it is carried by the conveyor 43 above a series say of three equalization tanks 50, 51, and 52, over a floor 53 that has an imperforate surface save for the provision in it of a corresponding number of openings 55, 56, and 57, above the equalization tanks aforesaid, respectively. Each of the said openings is equipped with a means for controlling and regulating its discharge as, in effect, an adjustable sliding gate. When the conveyor mechanism is running as previously described, the gate for the opening 55 is, as shown in Figure IX, opened about one-third of the way; the gate for the opening 56 is opened two-thirds of the way; and the gate for the opening 57 is fully opened so as to clear the entire opening. In this way the material carried by the conveyor 43 is distributed equally among the aforesaid equalization tanks, this distribution being maintained until the said tanks are filled to the desired extent. The tanks, of whatsoever number, are collectively of sufficient capacity to receive a number of batches of treated material coming from the boiler, and when filled in the way described serve as a means for averaging the results from the various softening or other treatments, thereby insuring a substantially uniform consistency of the contents, regardless of slight immaterial variations of results incidental to said treatments. A duplicate set of tanks and associated elements may be placed as shown in Figure IX, at the other side of the conveyor 43 from the tanks 50, 51, and 52.

The equalization tanks 50, 51, and 52, for example, are equipped, respectively, with agitators 58, which are preferably rotary, driven by any suitable connections, as by gearing and shafts shown, and which are connected to a motor, not illustrated, or other suitable source of driving power. Each of the said tanks is connected to a water supply. Preferably the water used in the tanks is condensation water from the paper machine driers which form a part of a complete plant, and the best results are obtained if this water is warm enough to give a temperature of approximately 100° F. in the tanks.

While in storage in the equalization tanks, the material is maintained in about a 5 per cent suspension, but before removing it for the next operation, sufficient water is added to reduce the consistency proportion to about 2 per cent material and 98 per cent water This addition of water, if made, is mainly for convenience in conveying the material, as by pumping it, to the point where the next operations are performed.

Associated with the equalization tanks is a centrifugal stock pump 61, connected to a header 62, the header in turn being connected by valve-controlled pipes 63 to the different equalization tanks, so that the pump 61 may conveniently be connected to any tank desired.

The pump 61 is also connected as by a suitable pipe 65 to an elevated flow box 66, Figures XII and XIII, containing three compartments 67, 68, 69, Figure XXI. The material first enters the compartment 67 and passes through a regulating gate 71 into the compartment 68 and through an outlet 72 to the upper one of a series of fiber separators described in detail later on. The compartment 69 is designed to receive overflow from the compartment 67, over a dam or weir 73, into an outlet 74 for returning the overflow and stock carried therein to the storage tank from which it came. The return connections for the overflow are not shown in detail, but any construction satisfactory for the purpose may be used.

The stock in suspension leaving through the outlet 72 enters a spread box 76 serving to spread the flow of the stock to form a flat sheet conforming in width to the throat or intake opening 77 of a fiber separator 78, constituting the first or upper one of a series of similar machines. The flow to the spread box 76 is controlled and regulated by a suitable adjustment of the regulating gate 71. The embodiment of my invention illustrated in the drawings, employs, by way of example, four separators arranged on a descending incline. They are all alike, with a single difference hereinafter explained, and a description of one of them, accompanied by an explanation of the difference mentioned, will be sufficient.

The separator 78 resembles in a great many respects the swing hammer machines used for pulverizing ores and clays, and, to a limited extent, certain vegetable growths, such as kelp and sugar cane. Such prior machines which have been used for pulverizing purposes are, however, unsuitable for the present purpose, and certain changes in them are required to be made in order to secure the desired effect upon the material passing through the machine.

The prior machines employed various forms of gratings and cutting bars, giving a cutting and pulverizing action which is highly undesirable to the extent of being substantially prohibitive in the treatment of the raw stock in order to carry out my present invention.

The separator or machine 78 employed in the present instance comprises a rotor 81, Figures XIV and XV, consisting of a number of disks supporting cross bars or rods 82, upon which rods are loosely pivoted iron plates or centrifugal hammers 83. The throat or intake opening 77 of the machine 78 opens into a hopper provided with bars 84 which are adjustable to cooperate with the ends of the plates 83 when the rotor 81 is turning in the direction of the arrow. The best results, for present purposes, are obtained when the bars 84 are so adjusted as to leave an appreciable gap between the ends of the plates and the bars.

In the prior machines used for the other purposes above mentioned, the plates 83 usually were constructed from stock $\frac{5}{16}$ of an inch thick, but in the present machine these plates are $\frac{3}{16}$ of an inch thick, and approximately twice as many of the lighter and thinner plates are used as were used in the older construction, the lighter and thinner plates being held apart on their pivots as by spacers between them.

In the prior machines the lower part of the enclosure for the rotor was composed of a series of sharp-edged cutter bars cooperating with the pivoted plates or hammers to cut the material between the hammers and the bars. As a result, the previous machines pulverized the material, an effect which, as above indicated, is wholly undesirable for present purposes. The present machines have a bottom plate 85 with a smooth concave surface substantially coaxial with the axis 86 of the rotor 81. The plate 85 in the separator is provided with numerous circular perforations 87, Figure XVII, which are preferably ¼ of an inch in diameter, although the size of the perforations may be slightly increased or decreased according to the result desired.

Considered as a whole, the increased number of light-weight plates or hammers 83, and the smooth interior and perforations described, cooperate to brush the material against the interior of the machine, causing thereby, a separation of the fibers, as distinguished from a cutting or pulverizing action upon them, the hammers 83 finally brushing the fibers through the perforations 87. The second of the separators 88 is the same, in every respect, as the machine 78 just described in detail. The separators 91 and 92, however, are different from the separator 78 in one respect, namely, that in both separators 91 and 92 the bottom plate 85, instead of having circular perforations, is provided with a series of slots 93 (Figure XVIII) which are preferably $\frac{1}{16}$ of an inch wide and 1 inch long, the slots extending in a circumferential direction or parallel to the direction of movement of the plates 83. This slotted construction results in retaining all of the material in the interior of the separator until the fibers have been separated sufficiently for them to brush through or escape through the slots.

By the time the material has passed through the last separator, the woody portions will have been reduced to fibers having a hair-like appearance, many of the fibers being of considerable length and substantially free one from another. Others of the fibers will be only partially separated one from another, resulting in what is, in effect, a coarse fiber.

For separation of the average lengths of wood fiber, the fiber separators, say four in number, operate consecutively upon the material, and means are provided for directing the flow from one separator to the next until the separating operation is completed. This directing means is, however, so constructed that by opening a suitable by-pass, one or more of the separators may be cut out, if the full complement thereof is unnecessary to the attainment of the degree of separation desired.

In addition to the by-pass, means are also preferably provided for regulating the water content of the flow, a change in the water content effecting a change in the results produced in each machine. In other words, the progress of the material through any one of the separators may be sped up or retarded by regulating the amount of water, a decrease in the amount of water causing a longer dwell and a greater degree of fiber separation, and an increase in the water supply resulting in a lesser degree of separation and a coarser condition of the fiber. The regulation of the water content also gives a flexibility in the operation of the separators, which makes it possible to adjust or regulate their operation, according to the species of the wood in the raw material.

When the fibers have passed through the perforated plate 85 in the fiber separators 78, it drops upon a slide or trough 95, Figure XIV, which conducts it to the receiving opening of the separator 88, which opening is like the opening 77, previously described in connection with the separator 78. The separator 88 is provided with a similar slide or trough 94 leading to the separator 91, and the separator 91 in turn has a trough or slide 90 leading to the final separator 92. Located near the lower end of each of the slides or troughs (90, 94, 95,) is a dam 89 which may be opened to admit or lowered to prevent the flow from the preceding separator to the next one. When the dam is lowered, a removable plug, not shown, is withdrawn from an outlet 96, allowing the flow which would otherwise have passed to the next separator to fall upon a chute or trough 97, which, at its lower end, communicates with a trough or spout 98, inclined as shown, and provided with openings in the bottom above the stock tanks employed. These openings may be equipped with suitable gates or slides so as to direct the flow of the stock to any one or all of the tanks desired.

While the slides 90, 94 and 95 were previously described in such a way as to indicate that they are continuous or imperforate surfaces, it is preferred to construct them of wire mesh which will allow a separation of the water and stock. Below such screens, 90, 94, and 95, imperforate slides or bottoms are provided having respective outlets 101, 102, and 103, each equipped with a valve 104. Normally, the valves 104 are closed, and after the spaces under the screens have filled up with water, the further flow is directed into the separators. Whenever it is desired to remove a part of the water before the flow enters the next separator, the valve in the corresponding outlet 101, 102, or 103, is set to allow all or any desired part of the water content to escape into a trough 105 leading to the return water tank 106. In addition to the outlets 101, 102, and 103, for allowing part of the water to escape, a separate water supply pipe 107, Figure XIV, of any suitable construction and capacity is provided with a valve 108 whereby water therefrom may be added at the throat of each separator, with a consequent speeding of the action in that particular machine. Only one of the pipes 107 is shown in the drawings, but it should be understood that each separator has the same water supply arrangement for the purpose stated.

The flow of material leaving the final separator, or the last one in operation if one or more of the separators has been cut out, goes to the trough 98, which has previously been referred to in connection with the water control, and then to whichever one of a series of stock tanks 111, Figures II and XII, is in condition to receive the stock. These stock tanks are equipped with preferably rotary agitators 110, each driven as by a gear connection 112 and 113 through a shaft 114 connected in any desired way with a motor 115. The stock is suspended in the tanks in a volume of water sufficient to give it a consistency of about a 2 per cent of stock.

The tanks are all connected to a header 118 equipped with a separate valve 119, whereby the tanks may be independently connected to and disconnected from the header. The header is connected to a stock pump of suitable construction and capacity for carrying the stock to a regulating box like the flow box shown in Figure XXI, but located above the rod mill shown, for example, in Figure XXII.

Said regulating box supplies stock in the required regulated amount to the rod mill, the excess stock in the regulating box being automatically returned to stock tank.

It is sufficient for present purposes to say that the stock from stock tanks is conveyed as required to a standard Fourdrinier or cylinder paper making machine for the purpose of forming and converting it into paper, indicated at A in Figure II.

The apparatus and process as so far described can be used in producing the fibrous stock and the finished paper from any of the softer woods. It is, however, preferable to use what may be termed the long-fiber woods, particularly satisfactory results having been obtained from sugar and white pines, and from fir. Fir is particularly suitable for the purpose, and a percentage of fir included with other woods increases the desirable qualities of the finished product.

The stock material may be reduced to pieces of a suitable size for the subsequent operations in any suitable way. Preferably, however, a conveyor system, such, for example, as is designated generally as 131 in Figure I, conveys the raw material to a point above the hopper 132 of a chipper 133. This chipper is preferably of the disk type, with knives 134 which are adjustable to regulate the size of the chips. The process as a whole is facilitated by keeping all of the chips under a maximum thickness of one inch and a length of approximately two inches. The precise length is not of importance, but the maximum length indicated is preferred, because it has been found to be the best one for satisfactory softening and fiberizing.

After passing through the chipper the chips fall into a bin 140, preferably having sides and bottom directing the chips to a belt-conveyor 141. The conveyor is inclined upward to elevate the chips to a hopper or chute 142 leading into the interior of a rotary chip screen 144, Figures I and V. This screen may consist of two tubular screens 145 and 146, one within the other, the inner screen being of any predetermined mesh which will screen out from the chipped material any part which is too coarse or too long for use to the best advantage. The outer screen 145 is of a finer mesh than the inner screen, and may be employed, if desired, to screen out dust and particles which are too small to serve a useful purpose in the final product.

The screen 144, as shown, is on an inclined axis, and when the screened material eventually reaches the lower end of it, the rejects leave the inner screen and may be carried by a suitable conveyor (not shown) to a rechipper or crusher, or disposed of in any desired way. The material leaving the lower end of the outer screen drops upon a belt-conveyor 147 which runs to a chip-bin conveniently located above the boiler hereinbefore described, from which bin the chipped material is removed for use in charging said boiler.

While the foregoing description has gone somewhat into great detail with respect to some of the various features of the invention and ideas, it is not the intention to limit the definition of my invention to such details except as they may be included in the following claims.

The foregoing specification includes description of apparatus that in its several parts is adapted to be combined and coordinated in such manner as the carrying out of my invention requires. I shall now, by way of description of operation and disclosure in further detail of what constitutes my invention, specify the manner of the combination and of coordination referred to in the last preceding sentence.

Accordingly, it is first in order to specify that, in the carrying out of my invention, raw material or wood with the bark on it that is to be fiberized is first supplied in the form of billets of suitable or convenient dimensions to the barking machine illustrated, by way of example, in Figures XXIV, XXV, and XXVI. By the operation of said machine, the wood is effectually decorticated, and the bark and other objectionable waste substance is separated from the fibrous or decorticated raw material, which is prepared for use by the barking machine.

The decorticated billets are then removed from the barking machine and by any suitable and preferred means of conveyance fed into a suitable machine for reducing the billets to small blocks or particles of substantially uniform predetermined dimensions. A form of such machine at present preferred being the chipper that is deemed to be sufficiently illustrated in Figures III and IV in view of the description of the specification relating thereto.

The blocks aforesaid, or chips as they may be hereinafter designated for convenient reference, are delivered from the chipper, for example of machine for producing the blocks, to the chip screening apparatus shown, for example, in Figure V of the drawings, delivery being made, in the manner already described, for example, by an endless conveyor 141 whose discharge end is shown in said figure.

The screened chips are, substantially in the manner hereinbefore specified, deposited into a boiler, such, for example, as that shown in detail in Figure VII and shown in series assemblage in Figure I.

After the softening operation, effected in the boilers 20, for example, the softened material is, as by mechanism illustrated in Figures IX, X, and XI, and specified in detail with reference thereto, conveyed to and distributed into the selected one of the various equalization tanks 50, 51, and 52, for example, where the material is, by the addition of water, converted into a suspension substantially of the consistency hereinbefore specified.

In that specified consistency, the material in suspension is conveyed, as by the pump 61 and pipe 65, to the flow box 66, substantially in the manner hereinbefore specified with reference to Figures XII and XIII.

From compartment 68 of the flow box, as through the outlet 72, the stock material in suspension passes in the manner and with the effect already specified, to the fiber separators (Figures XIV–XVIII, for example) where it is partially fiberized and separated, substantially in the manner and for the purpose hereinbefore specified.

The stock in suspension is passed from the fiber separators to the intake 148 of the rod mill wherein, by repeated operations, it is finally fiberized and the fibers are afterwards filamented into lengths of substantially admeasured standard, the fibers are separated into filaments of substantially uniform lengths suitable for forming and converting it into paper, substantially in the manner and by the means specified.

The rod mill is preferably of the type illustrated in Figures XXII and XXIII, and which is so well known as not to require description in detail. It is deemed sufficient to specify that it embodies in a rotative case 149 having a plurality of separate rod compartments 150, a complement in each compartment of alined metal rods 151. In consequence of the rotation of the case 149, a rolling and beating action of the rods within the several compartments upon the fibers fed into the mill ensues with the effect upon them of complete filamentation. The case is surrounded by two cylindrical screens 152 and 153 having meshes of different degrees of fineness which serve to separate out of the mass, fibers of such fineness as will pass the outside screen 153 and discharge said fibers from the mill into a sluice-way 155. Fibers which are too coarse to pass the screen 153 are automatically returned into the compartments 150 and are there subjected to repetition of the action of the rods 151 upon them, until they are ultimately reduced thereby to such degree of fineness as to pass the screen 153.

From the sluice-way 155 of the rod mill, the stock or fibers in suspension goes, by any suitable means of conveyance, to the screen shown in Figures XIX and XX, which serves to screen out all fibers of excessive lengths and render them ready for final conversion of them into paper by the operation of the paper making machine already indicated at A as supplying the final step of my process.

What I claim is:

1. The new and improved method of making paper which consists in first reducing long fiber wood to a suitable size by passing it through a chipper and maintaining the chips in a predetermined size, conveying the chips through a chip screen conducting the treated chips to a boiler and subjecting them to a softening operation, selectively conducting the chip material to equalizing tanks where the material is by the addition of water maintained in suspension, conveying the material under pressure to a flow box, then to a fiber separator, and conducting the material in suspension from the fiber separator to a reducing mill where the fibers are separated into filaments of substantially uniform lengths for forming and converting into paper.

2. The new and improved method of making paper which consists in conducting the raw material or wood with the bark on it in the form of billets to a barking machine so as to effectively decorticate the waste substance from the raw material, reducing the decorticated billets or chips to substantially uniform dimensions, conducting the chips through a screening apparatus to a boiler so as to subject the same to a softening operation, passing the soft material through equalizing tanks where the material by the addition of water is maintained in suspension, forcing the material under pressure to a flow box, passing the material in suspension from the flow box to a fiber separator where it is partially fiberized and separated, conducting the material in suspension from the fiber separator to a reducing mill where the material is finely fiberized and the fibers filamented into substantially admeasured standard lengths, and converting the fibers so produced into paper.

In testimony whereof, I have hereunto set my hand.

ARTHUR E. MILLINGTON.